3,151,888
PIPE RAILING CONNECTORS OR WELDING RINGS

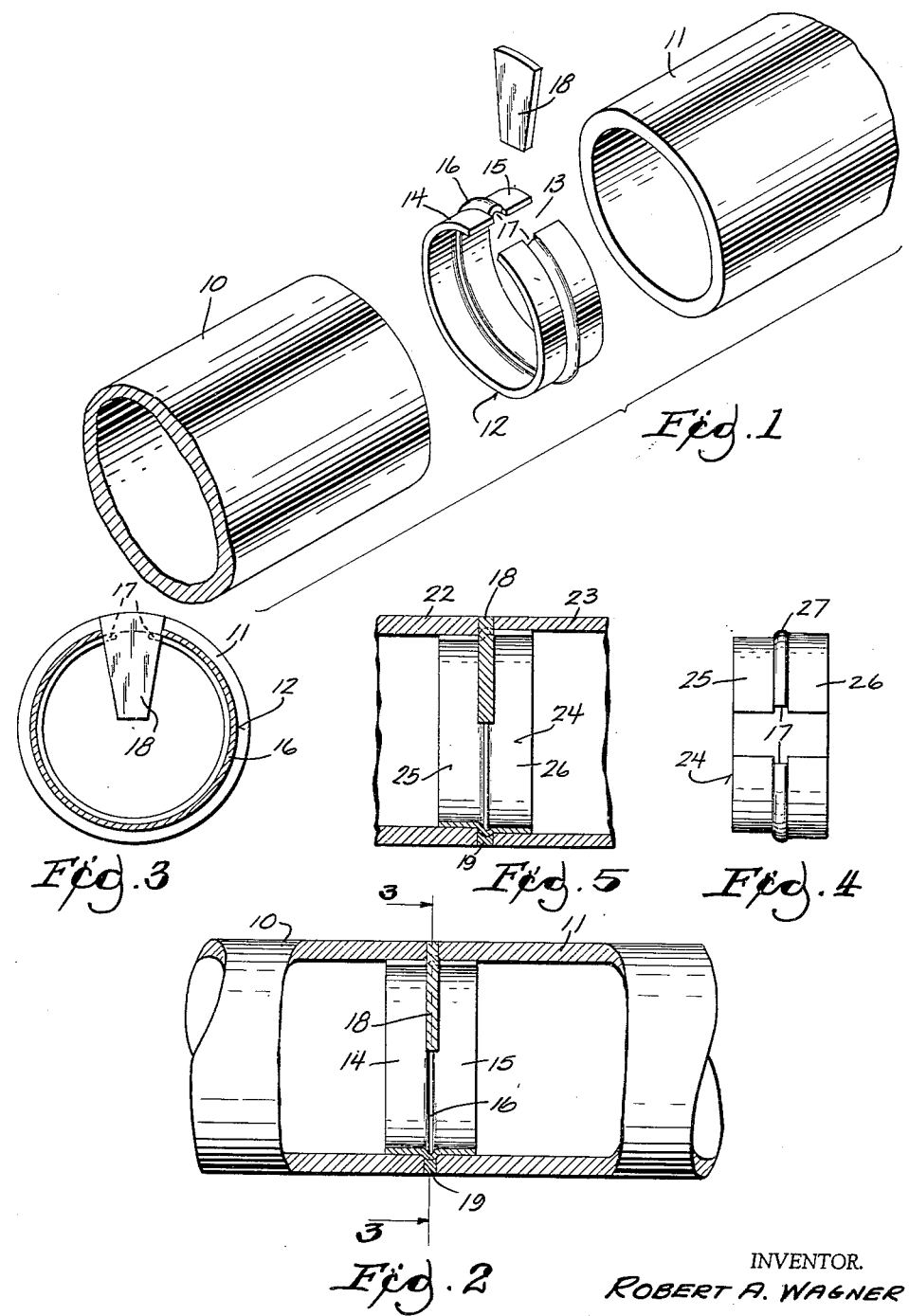

Robert A. Wagner, Milwaukee, Wis., assignor to R & B Wagner, Inc., Milwaukee, Wis., a corporation of Wisconsin
Filed Dec. 2, 1959, Ser. No. 856,846
2 Claims. (Cl. 285—22)

This invention relates to improvements in pipe railing connectors or welding rings.

It is conventional in the art to fabricate pipe railings by laying the pipe on a templet, temporarily interconnecting the pipe railing sections with frictional fittings or welding rings, and thereafter welding the sections over their welding rings for their permanent connection. Difficulty has been encountered, however, in providing a connection between the pipe sections and welding ring connectors which is sufficiently tight to hold the pipe sections together pending the welding operation. This problem is particularly aggravated where the various pipe sections are of different diameter.

The pipe sections may differ in diameter merely because of manufacturing tolerances which permit variations in diameter, ordinarily from five to ten thousandths of an inch. Moreover, where a light-weight thin-walled pipe member is to be connected to a conventional or standard thicker-walled pipe section, there will inherently be differences in the internal diameter of the two sections, even though the external diameters of the two sections are reasonably the same.

According to the present invention a pipe railing welding ring connector is expanded radially against the internal periphery of the respective pipe sections so as to increase the frictional pressure of the connector ring against the pipes. For this purpose the ring is split and I provide a wedge which may be seated in the gap between the facing edges of the split ring. The wedge is then driven radially inwardly to circumferentially expand the dowel ring. Accordingly, the ring will grip the pipe sections under relatively great pressure, thus to preclude inadvertent separation of the railing sections pending the welding thereof.

According to the present invention the wedge is simply left in place after it has been driven radially inwardly for the expansion of the ring. Any protruding portion of the wedge may be ground off flush with the pipe surface and the weld deposited in the gap between the ends of the pipe sections and around the wedge to make the wedge integral with the ring and the pipe sections.

In cases where there is a marked difference in the diameter of the two sections, for example where one is thin-walled and the other is of standard thickness, I may radially offset the respective flanges of the connector ring in an amount substantially equal to the difference in diameter between the two pipe sections. Accordingly, both such sections will be tightly gripped, notwithstanding the difference in internal diameter thereof.

Other objects, features and advantages of the invention will appear from the following disclosure in which:

FIG. 1 is a perspective exploded view of pipe sections and an intervening connector ring embodying the present invention.

FIG. 2 is an axial cross section taken through pipe sections interconnected by a connector ring embodying the present invention.

FIG. 3 is a transverse cross sectional view taken substantially along line 3—3 of FIG. 2 through pipe sections interconnected by said connector ring.

FIG. 4 is a side elevation of a connector ring having radial offset flanges.

FIG. 5 is an axial cross section taken through pipe sections having different internal diameters and interconnected by the connector ring of FIG. 4.

Railing pipe sections 10, 11 are interconnected according to the present invention by the welding connector sleeve or dowel ring 12. The dowel ring 12 is split circumferentially at 13, has oppositely extending axial flanges 14, 15 and a medial rib 16. In accordance with the present invention, the rib 16 is notched at both its ends as at 17 to provide guide seats to receive the tapered edges of wedge 18. Accordingly, the wedge is guided for radial movement and is maintained by the notches 17 in circumferential alignment with the rib 16.

The split dowel ring 12 is first compressed slightly against its own resilient bias to be received within the aligned pipe sections 10, 11, which abut the rib 16 endwise. The natural resilience thereof will tend to expand the flanges 14, 15 against the corresponding inner wall surfaces of the sections 10, 11.

Wedge 18 is then fitted into the notches 17 and is driven radially inwardly by a hammer or the like. Accordingly, the action of the wedge will tend to expand the flanges 14, 15 circumferentially to exert radial outward pressure against the inner walls of the pipe sections. After the wedge has been driven in far enough to securely lock its flanges to the pipe sections, any part of the wedge still protruding beyond the surface of the pipe sections may be ground off or otherwise removed. It has been determined that pipe sections interconnected according to the present invention will withstand separating pull up to 100 pounds or more. This is more than ample to withstand the most severe dislocating stresses to which such sections are subject pending welding.

Each joint in the pipe railing can be fastened in the foregoing manner and the connection can be made between straight pipe sections, elbows, T-sections, crosses, etc.

After the parts are interconnected, a weld bead 19 is deposited in the gap between the pipe section ends and over the rib 16 to fuse the pipe sections to each other, to the rib 16 and to the wedge 18, which remains in place. In effect, the wedge 18 becomes an integral continuation of the rib 16 circumferentially across the gap 13. An incidental advantage of the wedge is that it acts as a dam for the deposited weld metal.

As shown in FIGS. 4 and 5, the pipe sections 22, 23 may have different internal diameters. This is particularly true where pipe section 23 is of light-weight or thin-walled section and section 22 is of conventional or standard wall thickness. To accommodate for connecting two such sections, or simply to accommodate for relatively great differences in the internal diameter of sections to be coupled, I may provide a dowel ring 24 which has axially extending flanges 25, 26 which are radially offset at opposite sides of medial bead 27 a distance which corresponds to the difference in diameter of the inner surfaces of the pipe sections 22, 23.

Accordingly, when the wedge 18 is fitted into the notches 17 formed in the medial rib 27, the respective flanges 25, 26 will both be expanded under substantially equal pressure against the respective pipe sections 22, 23. As in the case of the previously described embodiment, a weld bead 19 is deposited between the ends of the sections and will unite the various parts as aforesaid.

I claim:

1. The combination with axially aligned pipe sections, of coupling means comprising a split dowel ring having axially extending flanges engaged with the inner surfaces of the respective pipe sections and a medial rib which intervenes between the ends of said pipe sections, the ends of said ring opposite said split having notches through said rib to provide radially disposed wedge guide shoulders, a wedge radially disposed in said notches and spanning across the split in the dowel ring and constituting a continuation of said rib and adapted when driven radially inwardly to expand the dowel ring circumferentially to press the respective flanges radially outwardly against said respective pipe sections, and a weld interconnecting the pipe sections, dowel ring and wedge.

2. The device of claim 1 in which one of said pipe sections has a greater internal diameter than the other pipe sections, said flanges being correspondingly radially offset.

References Cited in the file of this patent

UNITED STATES PATENTS

| | | |
|---|---|---|
| 69,506 | Stine | Oct. 1, 1867 |
| 633,037 | Pfahler | Sept. 12, 1899 |
| 1,870,711 | DeWitt | Aug. 9, 1932 |
| 2,382,098 | Robie | Aug. 14, 1945 |